United States Patent
Kahn et al.

(10) Patent No.: US 11,012,416 B2
(45) Date of Patent: May 18, 2021

(54) SYMBOLIC EXECUTION FOR WEB APPLICATION FIREWALL PERFORMANCE

(71) Applicant: Akamai Technologies, Inc., Cambridge, MA (US)

(72) Inventors: Andrew Jacob Kahn, San Francisco, CA (US); Yannis Drougas, Santa Clara, CA (US); Ameya Prakash Shendarkar, Oakland, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 189 days.

(21) Appl. No.: 15/900,313

(22) Filed: Feb. 20, 2018

(65) Prior Publication Data

US 2019/0222558 A1 Jul. 18, 2019

(30) Foreign Application Priority Data

Jan. 15, 2018 (GR) .............................. 20180100011

(51) Int. Cl.
*H04L 29/06* (2006.01)

(52) U.S. Cl.
CPC ...... *H04L 63/0263* (2013.01); *H04L 63/0236* (2013.01); *H04L 63/0245* (2013.01); *H04L 63/168* (2013.01)

(58) Field of Classification Search
CPC ............. H04L 63/0263; H04L 63/0236; H04L 63/0245; H04L 63/168
See application file for complete search history.

(56) References Cited

U.S. PATENT DOCUMENTS

| 6,141,749 | A | * | 10/2000 | Coss .................. H04L 63/0236 713/151 |
| 6,170,012 | B1 | | 1/2001 | Coss et al. |
| 6,854,063 | B1 | * | 2/2005 | Qu ...................... H04L 63/0245 370/392 |
| 7,240,100 | B1 | | 7/2007 | Wein et al. |
| (Continued) | | | | |

OTHER PUBLICATIONS

Extended European Search Report for counterpart application, EP Application No. 19151620.2, report dated May 31, 2019, 9 pages.
(Continued)

*Primary Examiner* — Saleh Najjar
*Assistant Examiner* — Devin E Almeida

(57) ABSTRACT

Among other things, this document describes systems, devices, and methods for executing rules in an application layer firewall, including in particular a web application firewall (WAF). An application layer firewall engine employs symbolic execution techniques that result in improved performance and efficiency. In preferred embodiments, an arbitrary firewall rule can be pre-processed to discover and define a set of one or more properties that an input must have in order for the input to have the potential to trigger the rule. By quickly examining an input for these properties, then application layer firewall can conclude that the input cannot trigger and therefore skip full execution of the rule against the input. This can be repeated for many if not all rules in a firewall ruleset. When a high proportion of the inputs have the required properties for rule-skipping, performance can be dramatically improved.

22 Claims, 10 Drawing Sheets

(56) References Cited

U.S. PATENT DOCUMENTS

| | | | | |
|---|---|---|---|---|
| 8,244,863 | B2* | 8/2012 | Wells | H04L 63/1416 709/224 |
| 8,458,769 | B2* | 6/2013 | Dilley | H04L 63/0218 726/2 |
| 9,223,969 | B2* | 12/2015 | Yoo | G06F 21/564 |
| 9,426,125 | B2* | 8/2016 | Phonsa | H04L 63/0218 |
| 9,426,166 | B2* | 8/2016 | Billa | H04L 63/0245 |
| 9,544,318 | B2* | 1/2017 | Tatourian | H04L 63/1416 |
| 10,083,024 | B2* | 9/2018 | Gopalakrishnan | G06F 8/65 |
| 10,135,702 | B2* | 11/2018 | Lahiri | H04L 43/12 |
| 10,572,230 | B2* | 2/2020 | Lucas | G06F 9/4498 |
| 2009/0077619 | A1* | 3/2009 | Boyce | G06F 21/55 726/1 |
| 2013/0254260 | A1 | 9/2013 | Stevens et al. | |
| 2013/0254343 | A1 | 9/2013 | Stevens et al. | |
| 2014/0376367 | A1* | 12/2014 | Jain | H04L 63/0263 370/230 |
| 2016/0182454 | A1* | 6/2016 | Phonsa | H04L 63/0263 726/11 |
| 2017/0153882 | A1 | 6/2017 | Gopalakrishnan | |
| 2017/0344743 | A1* | 11/2017 | Shi | H04L 63/1416 |

OTHER PUBLICATIONS

Baldoni, et al., A Survey of Symbolic Execution Techniques, Oct. 12, 2017, 52 pages. Available at www.arXiv.org, arXiv:1610.00502v2 [cs.SE] Oct. 12, 2017.

Beckert, CADE-21, 4th International Verification Workshop, Verify'07, Jul. 15-16, 2007, 219 pages.

Bluecoat Whitepaper, Web Application Firewall for Untrusted Web Environments, 2011, 7 pages.

Cox, Regular Expression Matching in the Wild, Mar. 2010, downloaded on Nov. 21, 2017, 11 pages. Available at: https://swtch.com/~rsc/regexp/regexp3.html.

Github, re2, downloaded on Nov. 21, 2017, 2 pages. Available at: https://github.com/google/re2/.

Google Open Source Blog, RE2: a principled approach to regular expression matching, Mar. 11, 2010, 3 pages. Downloaded on Nov. 21, 2017. Available at: https://opensource.googleblog.com/2010/03/re2-principled-approach-to-regular.html.

Viiret, J., REGEX Set Scanning with Hyperscan and RE2::SET, downloaded on Nov. 21, 2017, 9 pages. Available at: https://01.org/hyperscan/blogs/jpviiret/2017/regex-set-scanning-hyperscan-and-re2set.

Wikipedia, Common Gateway Interface, downloaded on Dec. 20, 2017, 7 pages. Available at: https://en.wikipedia.org/wiki/Common_Gateway_Interface.

Wikipedia, Regular Language, downloaded on Dec. 18, 2017, 7 pages. Available at: https://en.wikipedia.org/wiki/Regular_language#Equivalent_formalisms.

Yuan et al., Fireman: A Toolkit for FIREwall Modeling and Analysis, 2006, 15 pages. Available at: http://web.cs.ucdavis.edu/~hchen/paper/ieeesp2006.pdf.

Yuan et al., Fireman: A Toolkit for FIREwall Modeling and ANalysis, Proceedings of the 2006 IEEE, Symposium on Security and Privacy (S&P'06), downloaded on Oct. 19, 2017, 15 pages. Downloaded Oct. 19, 2017 from http://rubinet.ece.ucdavis.edu/people/chuah/classes/eec273/eec273-s14/refs/%5BYM+06%5Doakland06-fireman.pdf.

Response to EU Communication for counterpart application, EU Application 19151620.2, Jan. 16, 2020, 34 pages., Includes amended description and claims.

Brubaker et al., "Using frankencerts for automated adversarial testing of certificate validation in SSL/TLS implementations", 2014, downloaded Mar. 15, 2021 from https://www.cs.cornell.edu/~shmat/shmat_oak14.pdf, presented 2014 IEEE Symposium on Security and Privacy according to https://www.cs.cornell.edu/~shmat/research.html. 16 pages.

Robertson et al., "Using Generalization and Characterization Techniques in the Anomaly-based Detection of Web Attacks"; Network and Distributed System Security Symposium (NDSS), Internet Society. USA, Feb. 2006, 15 pages, downloaded Feb. 19, 2021 from https://sites.cs.ucsb.edu/~chris/research/publications.html.

Kruegel et al., "A multi-model approach to the detection of web-based attacks", Computer Networks 2005, Elsevier, 22 pages.

Kruegel et al., "Anomaly Detection of Web-based Attacks", CCS/03, Oct. 27-31, 2003, Washington DC, ACM 2003, 11 pages.

Communication Under Rule 71(3), with attachments, issued by EPO in counterpart patent applicaiton 19 151 620.2, dated Mar. 10, 2021.

* cited by examiner

```
1.    <security:firewall.activate>on<security:firewall.activate>
2.
3.    <akamai:firewall-config>
4.
5.            <!--Rule 1: deny requests with "root.exe" in the url -->
6.            <match:regex string="%(AK_URL)" regex="root\.exe">
7.                    <security:firewall.action>
8.                            <reject>on</reject>
9.                            <id>1</id>
10.                            <msg>Fishy url</msg>
11.                    <security:firewall.action>
12.            </match:regex>
13.
14.            <!--Rule 2: deny requests with "crawler" in user-agent-->
15.            <match:regex select="REQUEST_HEADER:User-Agent" regex="crawler">
16.                    <security:firewall.action>
17.                            < reject >on</reject>
18.                            <id>2</id>
19.                            <msg>Fishy user-agent</msg>
20.                    <security:firewall.action>
21.            </match:regex>
22.
23.    </akamai:firewall-config>
```

*FIG. 9*

SYMBOLIC EXECUTION FOR WEB APPLICATION FIREWALL PERFORMANCE

BACKGROUND

Technical Field

This application relates generally to firewalls used in network security and more particularly to rule execution in firewalls, including in particular web application firewalls.

Brief Description of the Related Art

Web Application Firewalls

Web application firewalls are known in the art. Operating primarily at the application layer, a web application firewall (WAF) inspects network traffic inbound and in some cases outbound from a server hosting a web application. WAF functionality can be implemented in software, hardware, or a combination thereof. The WAF applies a set of rules to the traffic, primarily the HTTP headers and body. Typically, the rules are designed to detect signatures in the traffic that represent or might represent an attack and/or a leakage of information from the web site. Common attacks include SQL injection, cross site scripting (XSS), and local file inclusion (LFI), among many others. An example of an open source WAF rule set is OWASP's modsecurity ruleset, which is adapted for the Apache HTTP server.

Many WAF rules use tests written in a regular language to determine the presence of an attack signature. A particular test is typically in the form of a regular expression, or regex. A WAF engine applies the regex to a designated portion of network messages and determines if the regex is triggered. The regex essentially directs the WAF engine how to search for a signature (such as the presence or absence of certain content, headers, and the like) in the network traffic. Tests using a regular language are not necessarily all regexes and some firewall rules may not be regexes in the formal sense, but nonetheless can be expressed and/or analyzed as a regex. For example, a WAF rule might contain a directive, for example: perform a 'dictionary' search for a given string 'netcat' on an input message. This directive can be expressed and/or analyzed as a regex. Another example is a directive to look for the presence of a particular application layer header, or the presence of a particular value in a particular field in a header or query argument or HTTP cookie. These can also be thought of and analyzed as regexes, as well.

Generalizing, in this document, the term 'regular expression' or 'regex' is used to refer to any test or application of a regular language, including regular expression, acceptable input to a discrete finite automaton, or equivalent forms such as those defined by Kleene's theorem or otherwise.

In some cases, a firewall rule may involve multiple regexes, or nested regexes. Further, the regex is typically designed to operate on a given part of network message (e.g., on the header, or on the URL, or on the message body, etc.). So, for example, a server must first apply a transformation to the message to obtain the correct portion in the correct form, and then apply the regex.

Conventionally, if a WAF rule is triggered, then the WAF rule directs the firewall to take a configurable action, e.g., issuing an alert, blocking the traffic, or the like. In a multi-tenant platform like a content delivery network, each customer can select a particular set of rules that they want to apply to their traffic, as well as create custom rules.

Because a WAF is inline to traffic processing at the web server, it necessarily introduces delay in the performance of the web application. Moreover, because WAFs are applied to so much traffic, the cumulative processing cost can be quite high. Therefore, the speed and efficiency with thick WAF rules can be applied is of utmost importance.

A simple approach to WAF rule execution is to execute all of the rules selected by a given customer to each HTTP request and then act on the results. This is not suitably scalable nor is it performant for large platforms.

One general approach for regex execution is to compile a set of regexes into a single state machine for more efficient processing, General purpose regex software such as hyperscan (<https://>01<dot>org/hyperscan) and re2 (<https://>github<dot>com/goggle/re2) implement such an approach and are known in the art. The re2 program provides an optimization called FilteredRe2 that takes a list of regexes and combines them into an expression that indicates the literal strings that are required to match at least one regex. By comparing an input to this expression, it can quickly determine whether the input could match any regexes from the set.

However, these approaches are inadequate and subject to improvement not only in the general case, but in particular for WAF rulesets, which are often more complex and varied than a simple search for a literal string, and which generally must be applied to complex HTTP entities that undergo significant processing in a web server. The teachings hereof address the technical problem of network security and of WAF performance and efficiency, and enable software and/or hardware components that can process WAF rules in an improved manner.

The teachings hereof apply not only to web application firewalls but without limitation to other application layer firewalls, as those skilled in the art will realize upon reviewing the disclosure herein.

BRIEF SUMMARY

Among other things, this document describes systems, devices, and methods for executing rules in an application layer firewall, including in particular a web application firewall (WAF) that handles HTTP messages. An application layer firewall engine employs symbolic execution techniques that result in improved performance and efficiency. In preferred embodiments, an arbitrary firewall rule can be pre-processed to discover and define a set of one or more properties that an input must have in order for the input to have the potential to trigger the rule. By quickly examining an input for these properties, the application layer firewall can conclude that the input cannot trigger and therefore skip full execution of the rule against the input. This can be repeated for many if not all rules in a firewall ruleset. When a high proportion of the inputs have the required properties for rule-skipping, performance can be dramatically improved.

The foregoing is a description of certain aspects of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which:

FIG. 9 is an example of XML metadata implementation of a firewall rule for use in a content delivery network (CDN) server or otherwise; and, FIG. 10 is a block diagram illustrating hardware in a computer system that may be used to implement the teachings hereof.

DETAILED DESCRIPTION

Figure 1:
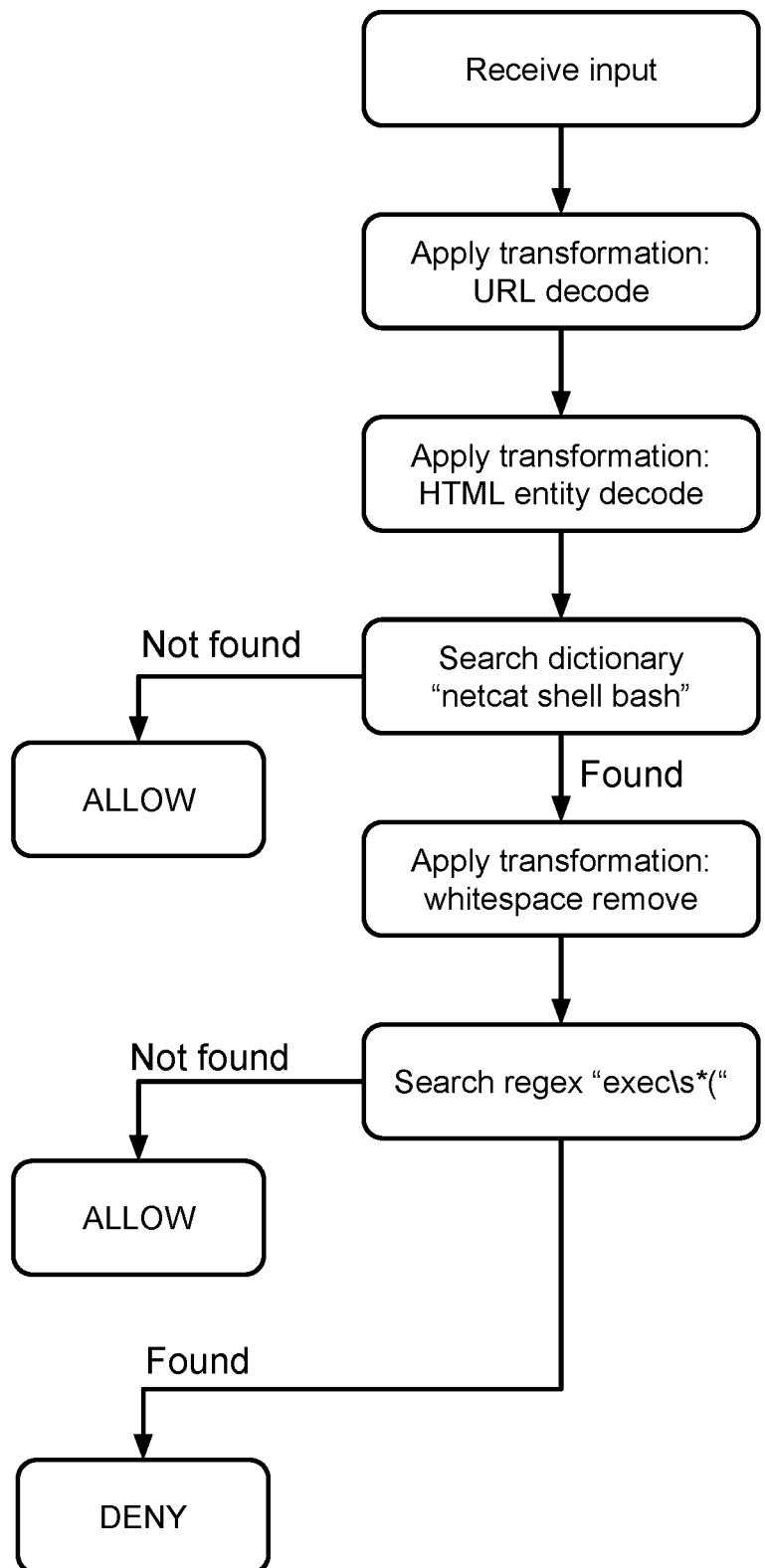
FIG. 1 is a diagram illustrating steps in the execution of a firewall rule on a given input, in one embodiment.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term 'web' application firewall is meant to refer to network traffic carried in HTTP at the application layer. However, the teachings hereof can be applied to any application layer firewall; web application firewalls are being used as an important and illuminative example.

Introduction

Executing a WAF rule on an input to look for a signature can require a significant amount of overhead: parsing the input, copying the input data as needed for rule execution, doing transformations, calling into the regex library, then checking if the match was successful and handling either case.

Described in this document is an approach for applying symbolic execution to signature-based WAF engines to enable runtime optimizations. Runtime costs come from applying signatures to input data, and doing so may involve various preprocessing or decoding steps in addition to regex searches. A one-time symbolic execution pass can determine characteristics of input data that can never match a signature, or that has the potential to match only a subset of WAF signatures, reducing the amount of processing and searching which must be done on each input. The technique herein are most effective when the WAF engine executes much more often than it is changed (e.g., signatures added, removed, or changed), which is typical for an Internet-facing signature-based WAF engine. However, that is not a limitation, the teachings hereof can be used regardless of how often the WAF engine is changed.

Signature-based WAF engines can be modeled as a tree of operations where the inner nodes are data processing operations and the leaf nodes indicate the action for the firewall to take (allow, deny, etc.). Symbolic execution can be applied to this tree based on a set of properties: length of the input, character presence in the input, string presence in the input, as examples. We also can define negative and compound properties: length of the input given the input contains no non-alphanumeric characters, for example.

It is important to remember that a WAF rule may be executed on not only an application layer message as a whole, but also on a specific portion of that message. That is, the "input" could be any part or the entire HTTP message. For example a WAF rule might entail a regex on a POST body, or a POST body parameter, or on the URL portion of an HTTP message, or a search in the contents of a cookie or HTTP header. The corresponding property to look for, such a minimum length or character-set, would be in the relevant portion of the message.

Below are two specific examples of properties that an input might have that could result in a conclusion that a given firewall rule can never be triggered; these examples are not intended to be limiting.

Minimum Match Length Property

Two observations are available to motivate an optimization based on minimum match length: (1) A significant amount of inputs to a WAF are often very small, especially for name-value pairs such as cookies and argument selectors which have been parsed into smaller bits from the original HTTP request. (2) Because many modern regex execution engines, such as RE2, operates as a state-machine, reading input linearly byte-by-byte, it is possible to design a mechanism that calculates the shortest possible match for a given regex. This manifests as a breadth-first search of the state-machine tree that exits at the first matching state.

Given these two observations, we can design an optimization based on minimum match length to avoid processing of inputs that cannot possibly match, eliminating both overhead and execution time.

Character Subset Property

If the input uses only a certain subset of characters, we can constrain the state machine graph traversal to only use a subset of nodes and edges such that finding a matching state may take longer than in the normal case. Further, many regex patterns are such that they can never match if the input is alphanumeric only, though many inputs only contain alphanumerics. This means that there is no path through the tree that matches, that is, triggers the firewall rule (e.g., deny, alert). Another example is that some regex patterns in a rule can never match if the input contains only alphanumeric-pdu symbols, which is the set of alphanumeric and a period [.], dash [-], and underscore [_] symbols. Another example is that some regex patterns in a rule can never match if the input contains only basic grammatical (non-mathematical) symbols.

Specific Example

Examine the tree shown in FIG. 1. The processing of an input HTTP message or portion thereof proceeds from the first step through multiple transformations to process the input content. Transformations include decoding the URL, decoding any HTML entities, extracting and decoding a cookie, and the like. In this example, there are two tests applied, one a dictionary search for certain words in the input ("netcat" or "shell" or "bash") and the other a regex for the string "exec\s*(". This rule might be used to protect a web server that processes URL parameters using a cgi interface. Such a web server may be misconfigured to process a URL argument as code rather than text under certain conditions, and so the rule looks for malicious input in the URL.

Depending on the outcome of the tests, the WAF processing depicted in FIG. 1 results in an 'allow' state or a 'deny' state. As those skilled in the art will understand, the 'deny' state represents the WAF rule being triggered to a 'deny' action; the action could be configured to be an 'alert', of course, or other desired action upon a triggered rule.

Figure 2:
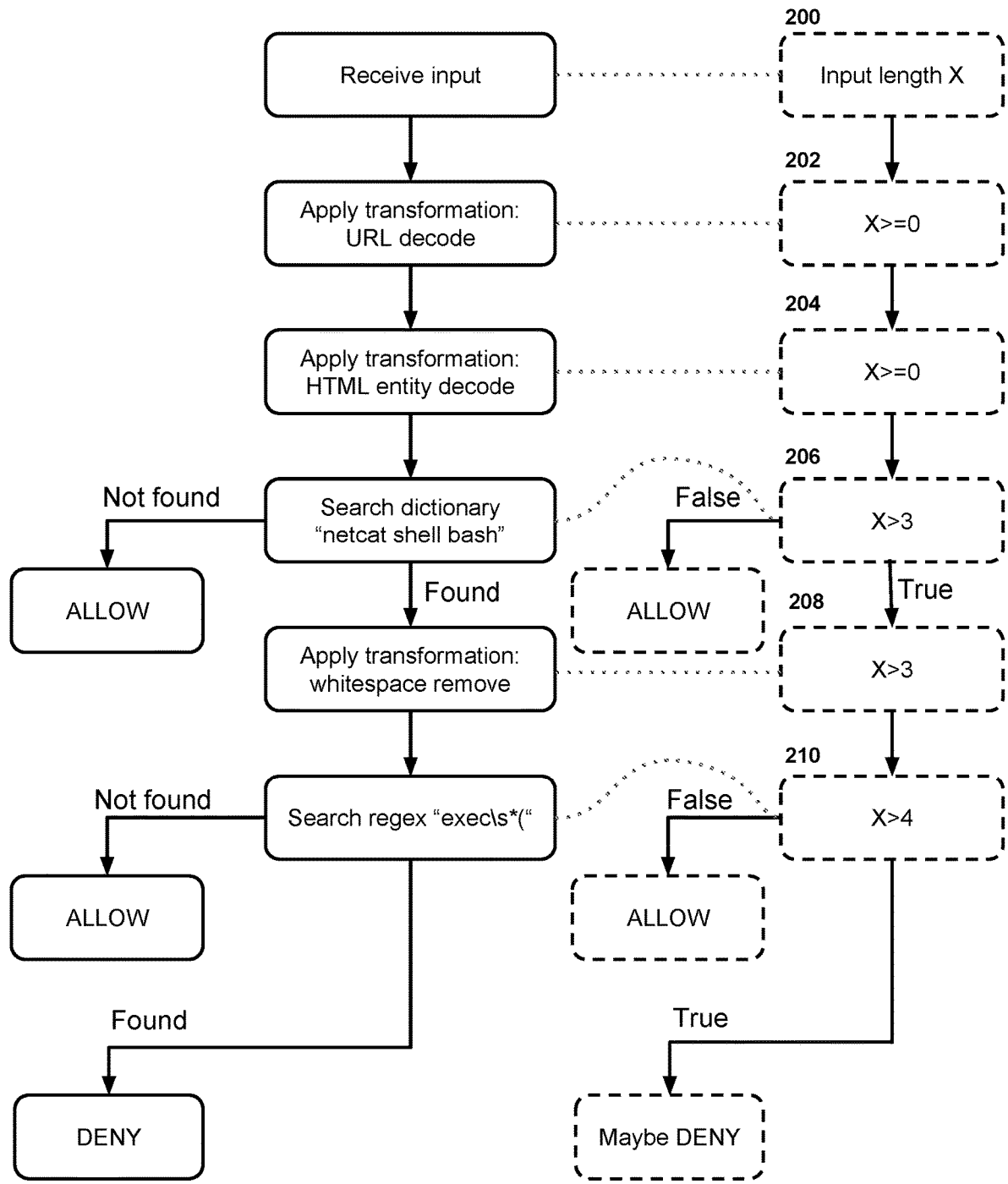
FIG. 2. is a diagram illustrating one embodiment of symbolic execution and analysis of the firewall rule shown in FIG. 1, to determine minimum match length.

One can apply symbolic execution for arbitrary properties of this tree; we start with symbolic execution to determine minimum length. In all cases, we take the worst case result of an operation (for example, a decoding step in the worst case does nothing, so the size of the input remains unchanged). The result is shown in FIG. 2. The left hand side shows the processing steps from FIG. 1. On the right is the analysis at each step corresponding to a given processing step is indicated with a dotted line. The input length starts as an unknown, X (200 in FIG. 2). For the URL decode and HTML entity decodes to be performed, the input must have some length (or they would fail), so X must be greater than or equal to zero to proceed (202, 204). At the "search dictionary" step (206), one of the given terms must be present, and the shortest term has four characters X=4, so in order to proceed in the tree towards the deny state, it is required that X>3. If that were false, i.e., X<=3, then the firewall would go to Allow. Moving to whitespace removal step (208), the whitespace removal transformation is treated conservatively as potentially not adding to the length, so it remains that X could be any value greater than 3. Moving to the regex step (210), if the input X<=4, then the WAF would allow the input, as the regex requires at least 4 characters. Hence, for the regex to be true and potentially move to the deny state, X>4. This means that only inputs with a length greater than four have the potential to lead to the deny state. Put another way, if input length X is less than 5, the WAF rule will never lead to a deny, and it is not necessary to go through the full processing at all. The input simply can be tested for X<5? and when this evaluates to true, WAF rule processing can be skipped, saving time.

Figure 3:
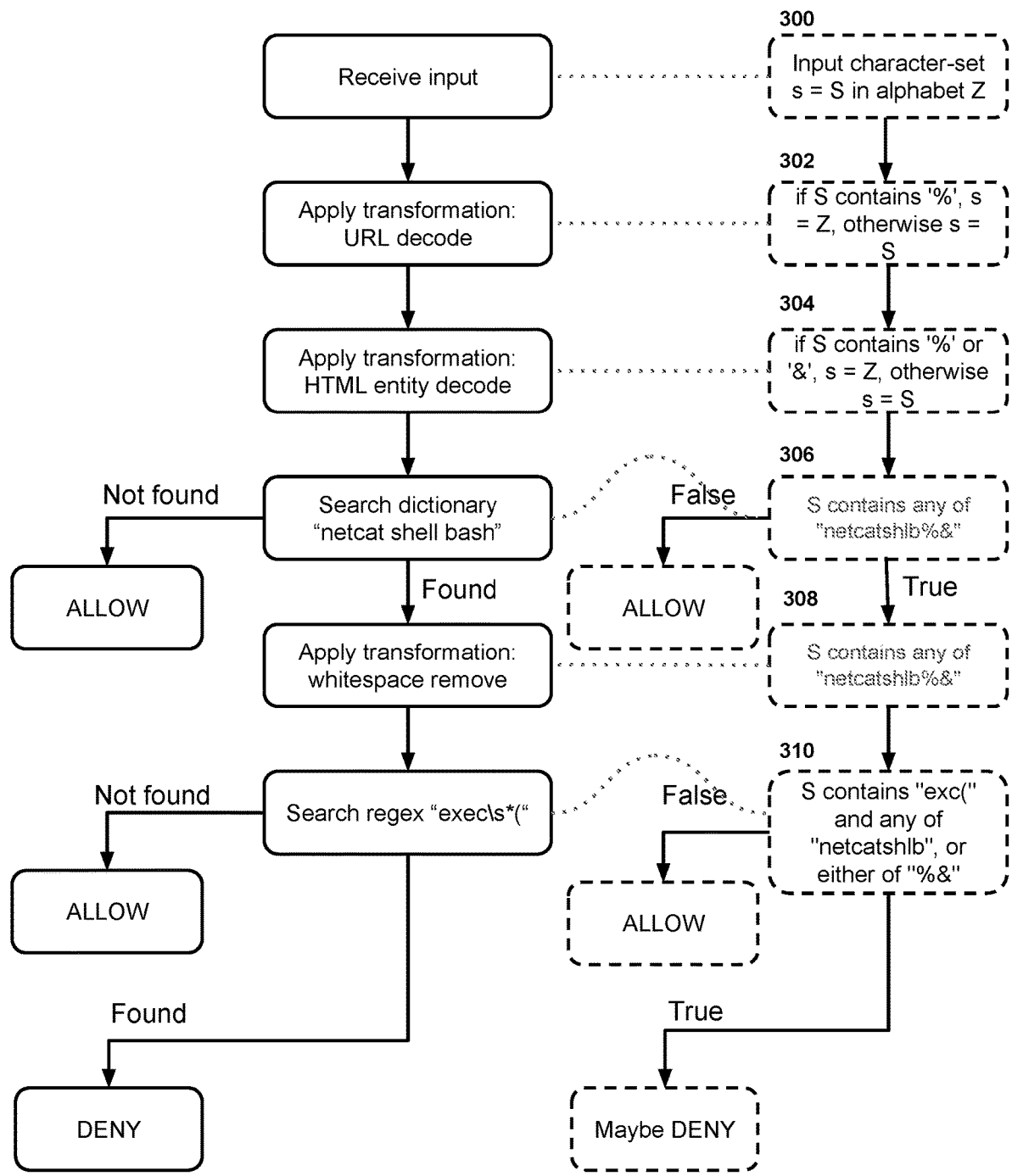
FIG. 3 is a diagram illustrating one embodiment of symbolic execution and analysis of the firewall rule shown in FIG. 1, to determine required characters.

We can take the same example (FIG. 1) and apply the symbolic execution based on character presence. The result is shown in FIG. 3. On the right we show equivalent steps to find given an input which characters must be present in it to potentially reach a deny state. As in the length check in FIG. 2, we take the worst case of any given step to determine a lower bound of character presence requirements. In the first step (300), the input contains arbitrary characters within a given alphabet Z. After applying a URL decoding transformation, any '% NN' sequence (where N is a digit) could have been decoded into some other character not previously present in the input. As an approximation, we say that if the input contained '%' then it has potential to represent any character in the input alphabet (302). With the same assumptions, HTML entity decoding could have decoded any '&' under certain circumstances into another arbitrary character in the alphabet (304). After these two steps, we assume the input contains all its original characters, plus all characters in the alphabet Z if one of those original characters was '%' or '&'. At (306), the dictionary search for netcat, shell, or bash, indicates that the input must contain at least all of the characters in one of those strings. The dictionary search is also satisfied if the input contains '%', or '&', because those could represent any character. If an input has none of these characters present ("False"), it cannot lead to a deny state. Assuming the result is "True", the logic moves to 308, where whitespace characters are removed; however, this doesn't change the required character set. At 310, the final search is for the regex "exec\s*(" which indicates new requirements for the characters "exc(", in addition to any of the characters required in the first search "netcatshlb". Or, if the input contained "wildcards" characters '%' or '&', as before, it is assumed to be possibly containing all possible input characters including "exc(", and so can still lead to the deny state. Said another way, an input not containing all of the characters "exc(" must contain either '%' or '&', and must contain one of the characters "netcatshb%&", to potentially match the input.

Summarizing the results of the analysis shown in FIGS. 2 and 3: in the minimum match length example, we found that based on this symbolic execution, any input where size is less than 5 can never get to a Deny node in the tree. These inputs can be elided by the WAF engine. With another property we could find required characters for entering different subtrees to reach the Deny. Preferably, the choice of which properties to analyze for can be chosen to maximize the difference between common inputs and known requirements of the WAF, as most inputs to a WAF will be benign, short alphanumeric strings while most signatures look for special characters or malicious sequences of strings. In this way, a small set of properties which are computationally cheap to execute on input data can realistically lead to eliding a large portion of signature processing, perhaps even 75% or more, which gives significant boosts in WAF engine efficiency.

System Design

A detailed implementation to leverage the above teachings is now described. Generally speaking, the system can include a pre-processing component constructed to pre-process each WAF rule or set of rules. The pre-processing steps involve the symbolic execution passes described above. The result of pre-processing is that each WAF rule (or ruleset) is associated with a test, such as length(X)<5? in the previous minimum length example. This test is referred to as a "skip test", because if the conditions of the test are met, processing for the corresponding WAF rule can be skipped. The pre-processing of a plurality of rules can occur offline to create a list of a plurality of skip tests. When the system is operational, the WAF engine receives an input (e.g., a client sends an HTTP message to a server running the WAF engine). Whenever a WAF rule is to be applied, the WAF engine first tests the input (e.g., the relevant portion of the HTTP message) using the skip tests. The WAF engine skips full processing for each WAF rule when the rule's associated "skip test" indicates that the input cannot trigger the rule. Any remaining WAF rules are then executed as usual. The process is shown at a high level in FIG. 4.

Preferably, the system can skip processing an input if the input length is less than the minimum match length for a rule either before a transformation or after a transformation. Here, the term transformation refers to a transformation performed by the HTTP server during request processing, or more generally, in application layer request processing. There may be any number of transformations. Before a transformation, it is only possible to skip the input if the upcoming transformation cannot cause the input to change in such a way that would invalidate the skip test. For minimum length tests, this means the transformation cannot cause the input to grow. For character set tests, this means the transformation that the transformation cannot "make symbols", that is cannot cause one character to become another character. Either way, it is referred to as an "early skip". The system is configured with tags for all transformations as either "can grow input" or "cannot grow input" and "can make symbols" or "cannot make symbols". Exemplary tags are shown in Table A, below.

TABLE A

| Transformations | Class |
| --- | --- |
| compressWhitespace, cssDecode, escapeSeqDecode, htmlEntityDecode, jsDecode, lowercase, normalisePath, normalisePathWin, removeNulls, removeWhitespace, replaceComments, replaceNulls, trim, trimLeft, trimRight, urlDecode, urlDecodeUni | Cannot Grow Input (eligible for early-skip) |
| base32Decode, base64Decode, hexDecode, base32Encode, base64Encode, hexEncode, length, md5, parityEven7bit, parityOdd7bit, parityZero7bit, sha1, sha256, urlEncode | Can Grow Input or Make Symbols (not eligible for early-skip) |

After transformations, processing of the rule can be skipped if the input size is less than the "all" minimum match length: this is termed a "late skip".

In some embodiments, the system can perform only a subset the skip tests during a late skip, in particular skipping tests that were ineligible for early skip on the premise that after transformation the input is not likely to have changed in a significant way (i.e., it's unlikely that an input that was not alphanumeric before transformations becomes alphanumeric). In such cases the cost of checking for the condition may be more than the benefit obtained.

In sum, an early skip can occur when the input size is less than the minimum match length for the WAF rule AND the input matches the required character subset AND the transformations to be applied before the rule is applied are ALL tagged as cannot grow input. For an early skip, the input is never copied, transformations are never performed, and regex execution never happens. A late skip may occur when the input size is less than the minimum match length: either because early skip was disabled, early skip was not performed because of transformations that might grow input, or the transformations actually shrunk the input such that the input size is less than the minimum match length. In this case, regex execution time is avoided, but other overhead still occurs.

Figure 4:
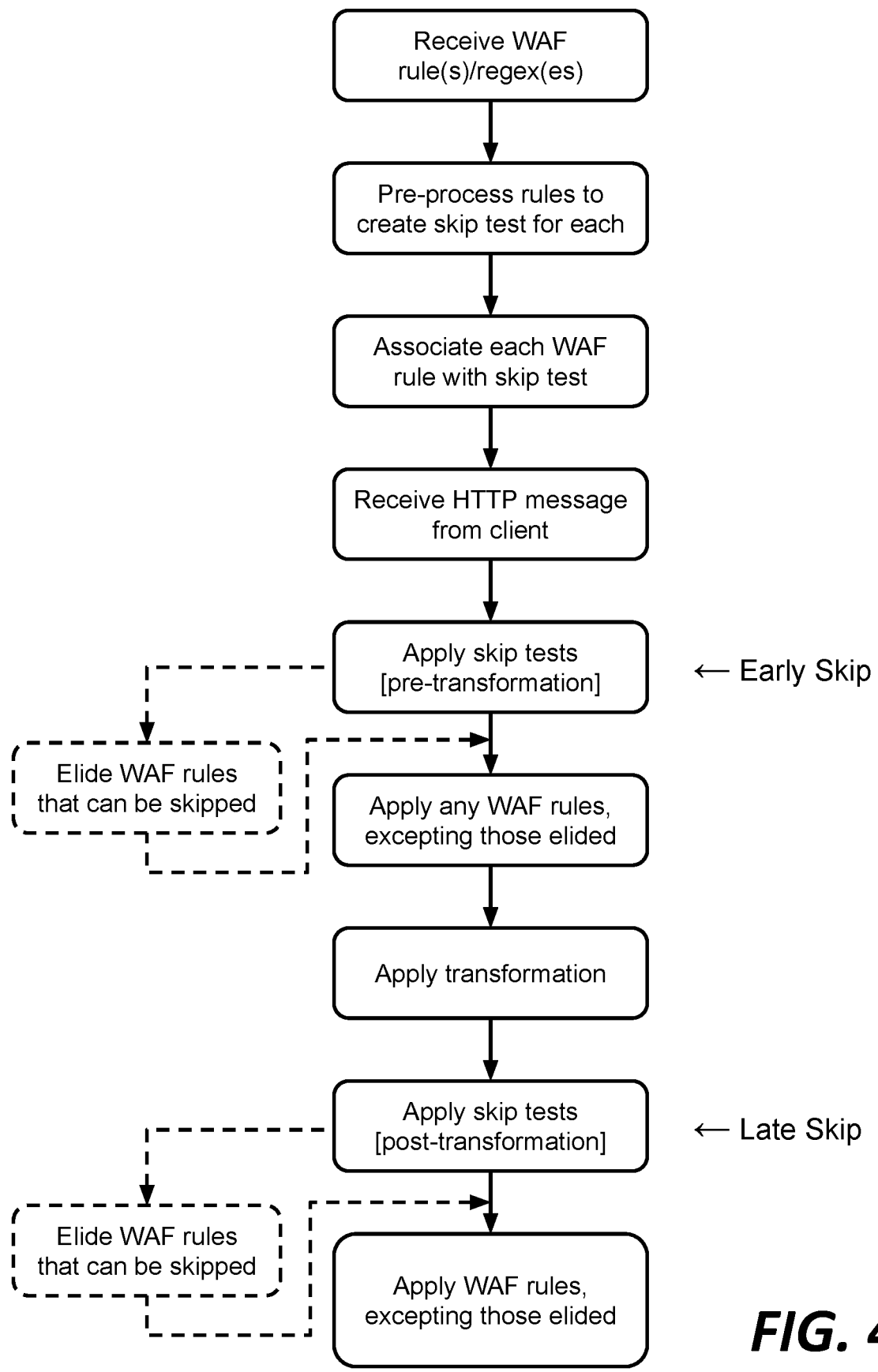
FIG. 4 is a diagram illustrating one embodiment of a processing flow in a system that applies the teachings hereof to skip firewall rule execution based on the input having certain properties.
Figure 5:
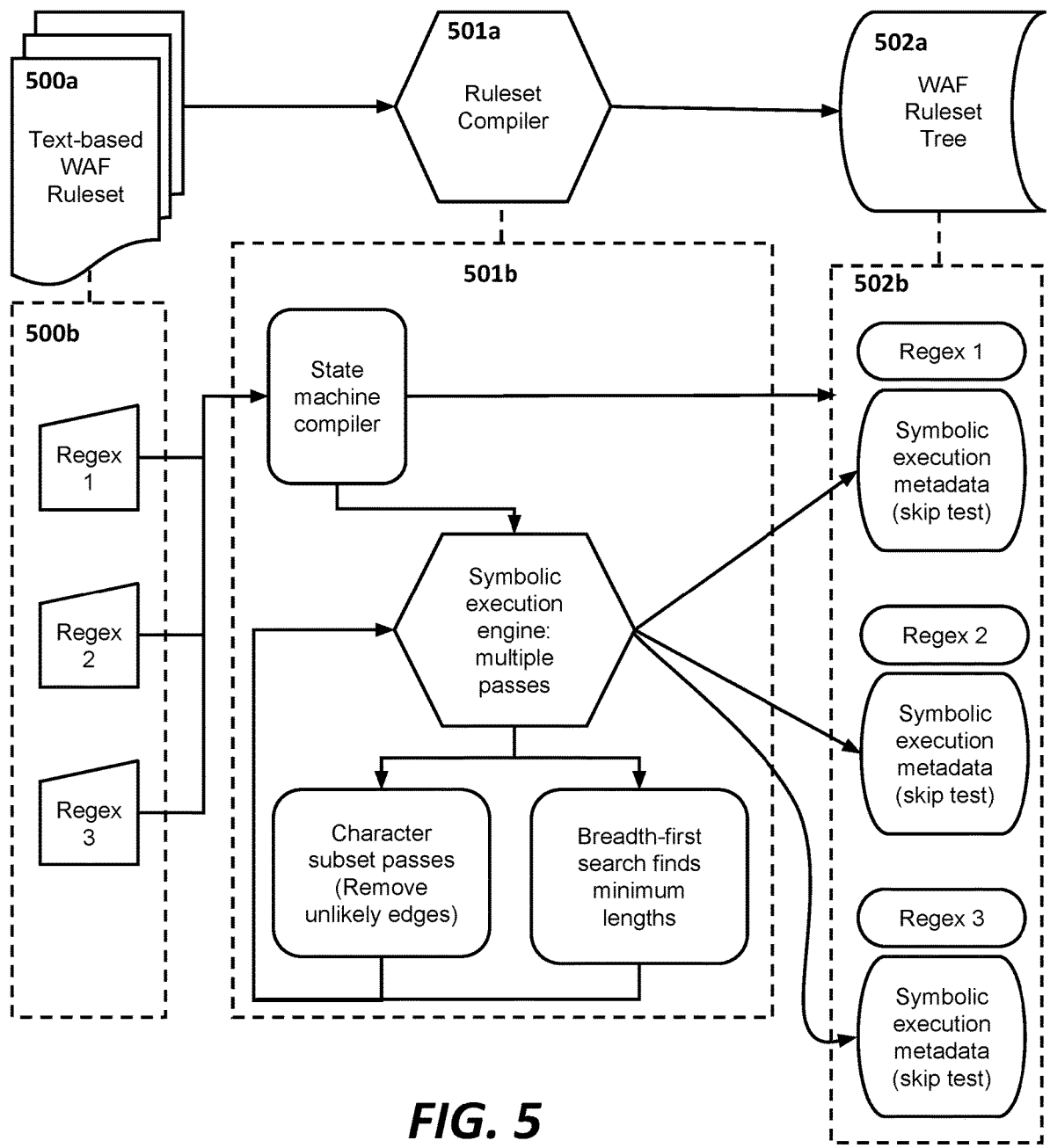
FIG. 5 is a block diagram illustrating functional components in the system described with respect to FIG. 4, in one embodiment.

To further understand the operation of the system, please refer to FIG. 5, which is a diagram illustrating system implementation in a functional block format rather than the step-by-step-oriented format of FIG. 4.

FIG. 5 shows a text-based WAF ruleset 500a. Assume that the ruleset contains three rules each of which contains a regex (or function that can be expressed as a regex), which is shown in the box 500b. For automated pre-processing using symbolic execution, each WAF rule is fed into a ruleset compiler 501a, whose components are shown in the box 501b. Specifically, each WAF rule is fed into a state machine compiler, such as a that provide by the ret regular expression library. In this implementation, the rules are analyzed in iterative fashion, meaning that each regex is analyzed separately.

The state machine compiler produces a state machine for a regex. The state machine can be modeled and referred to as a tree or graph of states, as known in the art. The state machine for each regex is sent to the final WAF ruleset tree 502a, whose contents are shown in box 502b. This enables the WAF to execute a given rule by executing the associated state machine (i.e., traversing the tree) based on a given input. In some embodiments, the individual trees can be optimized by combining them into fewer or even a single tree by removing redundant nodes and or "or"ing the trees together.

The state machine compiler also sends the state machine for each rule to the symbolic execution engine. The symbolic execution engine executes one or more passes through the state machine. In general, the goal of each pass is to discover input properties for which the regex can never be triggered and thereby produce a skip test to such identify traffic. The input properties for which the regex can never be triggered are revealed, in this implementation, when there is no path through the tree produced by the state machine compiler, or when the path through the tree requires the input to be very long—longer than most inputs are likely to be.

Each pass is preferably directed to determining a set of one or more properties that is a likely candidate for success in producing a skip test. Put another way, the inputs to a WAF rule can be thought of as falling into three classes: a class that may trigger the rule and a class that can never trigger the rule. The goal is to identify the broadest class of inputs that can never trigger the rule. Based on the nature of the WAF rules, likely candidates can be selected by probing/testing the tree. For example, the general purpose of some WAF rules are to look only for specific control characters and hence it is likely that they are never going to be triggered if the input is limited to alphanumeric characterics. The symbolic execution engine can make a pass through the tree constraining the input to alphanumeric characters only, to determine whether the aforementioned notion is in fact correct. Other examples include:

Input is less than a particular length.

input consists only of alphanumeric characters.

Input consists only of symbols from a set of characters that includes alphanumeric characters plus the characters for a period [.], a dash [-] and an underscore or low line [_]. This is referred to herein as the "alphanumeric-pdu" character set, p for period, d for dash, and u for underscore. These are commonly used as delimiters in HTTP traffic.

Input consists only of grammatical characters (non-mathematical).

Figure 6:
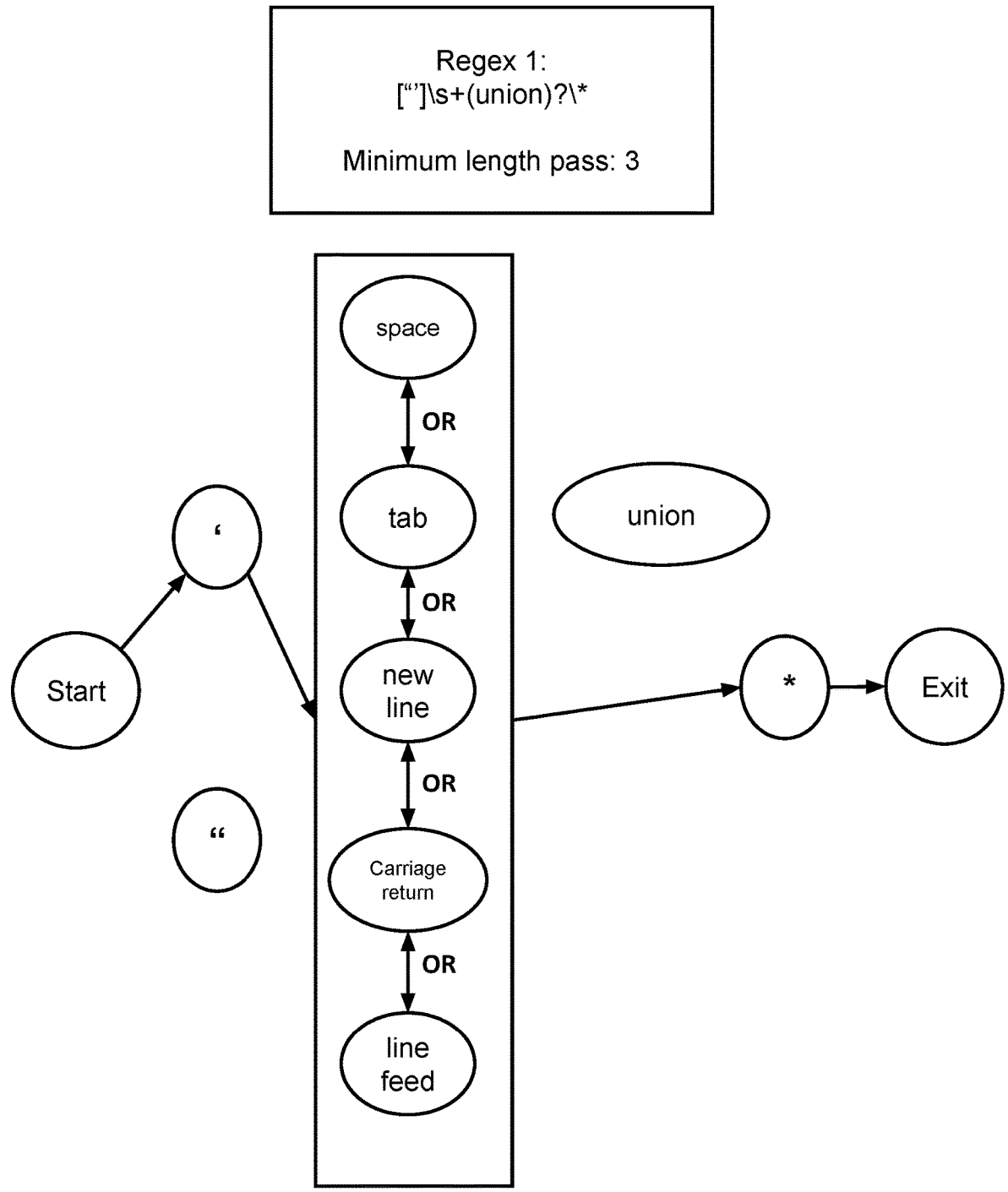
FIG. 6 is an example of a symbolic execution pass shown in FIG. 5.
Figure 7:
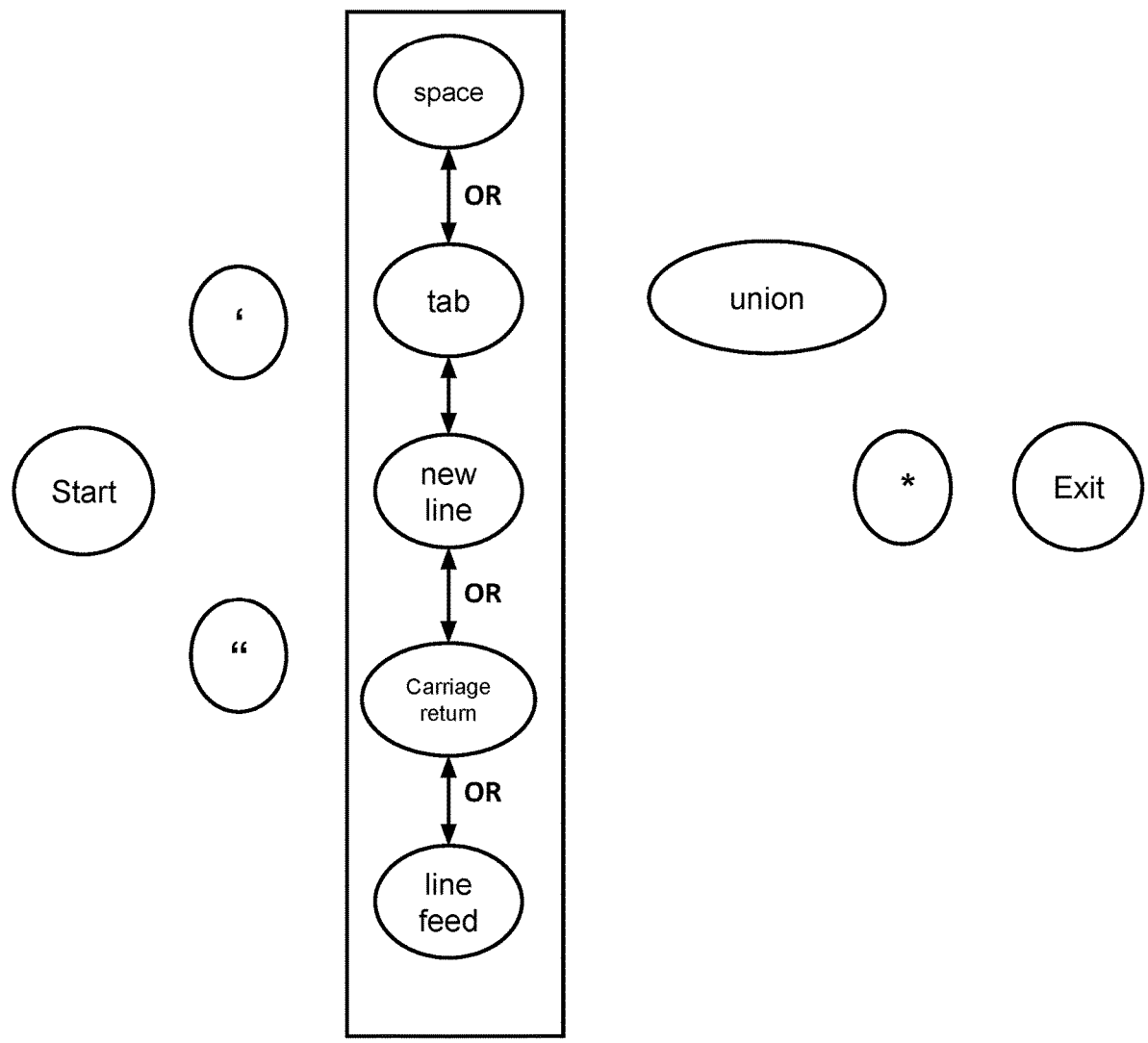
FIG. 7 is an example of another symbolic execution pass shown in FIG. 5.
Figure 8:
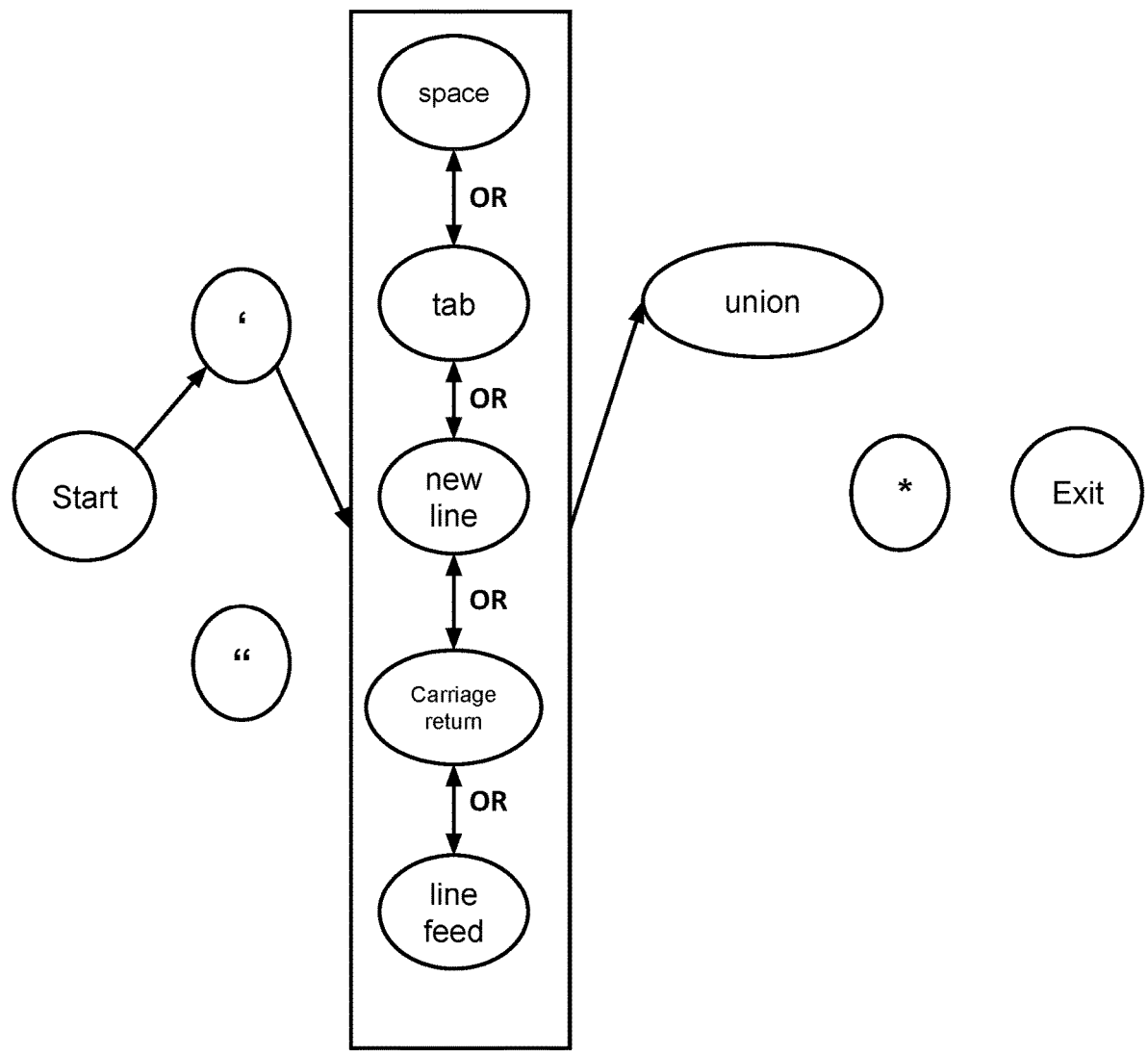
FIG. 8 is an example of another symbolic execution pass shown in FIG. 5.

FIGS. 6-8 depict symbolic execution passes in more detail for 'Regex 1'. The regex used in this example for Regex 1 is: ["']\s+(union)?\*. This regex is looking for the following:

["']: one of any of the characters ' or "

\s+: one or more whitespace characters (union)?: 0 or 1 occurrences of the character string union \*: 1 occurrence of *

As those skilled in the art will understand, the operators used in this regex are:

[ ]: character set operator, to indicate any characters may match within a set

\s: whitespace character

+: operator to indicate 1 or more of the previous pattern ( ): grouping operator ?: operator to indicate 0 or 1 of the previous pattern \: used to escape special operator characters to use them without special meaning The state machine, or tree, corresponding to Regex 1 is shown in FIG. 6. FIG. 6 illustrates the results of the symbolic execution pass to find the minimum length path through the tree. The minimum length path is shown using solid lines. While other edges in the tree are traversed as part of the symbolic execution pass, they are not shown in FIG. 6 because they are not on the minimum length path.

FIG. 6 shows a pass to determine the minimum length that an input must have to trigger the WAF rule. Preferably, as mentioned in in FIG. 5, this is accomplished via a breadth-first search of the tree. In this example, the pass begins at Start, goes to the single quotation mark, then to one of the whitespace characters. Typically for HTTP messages, there are five characters that can be considered a whitespace character: space, tab, new line, carriage return, and line feed. Therefore, there are five matching states shown in FIG. 6, which are "or'd" together. (Of course, depending on the alphabet, one might have other characters that qualify as whitespace. E.g., a nonbreaking space character.) Consequently, the symbolic execution pass can go to any one of these states, and then move to the next state. Because the term union is not required, the algorithm passes to the asterisk, and exits. The 'Exit' state here represents the WAF rule being triggered to take an action, i.e., 'Deny' or 'Warn'. It is implicit that if the exit state is not reached, the result is an 'Allow' state for the WAF rule.

During the pass shown in FIG. 6, the number of characters required to pass through the tree to the exit is tracked; in this case, the number is three. Hence, a skip test for Regex 1 is whether the input is less than three characters.

FIG. 7 represents another pass through the tree for Regex 1. This time, the pass involves constraining the input to the subset of characters that consists only of alphanumeric characters. As can be seen, there is no path through the tree for the constraint. As a result, an alphanumeric subset defines a successful input property for a skip test. Hence, another skip test for Regex 1 is whether the input has only alphanumeric characters.

FIG. 8 represents another pass through the tree for Regex 1. This time, the pass involves constraining the input to the subset of characters that consists only of basic grammatical characters (non-mathematical). As can be seen, there is no path through the tree for the constraint, due to the requirement for the asterisk. As a result, this character subset defines a successful input property for a skip test. Yet another skip test for Regex 1 is whether the input has only basic grammatical characters (non-mathematical).

As those skilled in the art will appreciate, any number passes can be made through the tree with various constraints on the input to determine any number of skip tests.

When using the re2 regular expression library, the operations just described with respect to FIGS. 6-9 can be implemented by adding an additional interface can be added to the re2 regular expression library. Preferably, the interface is implemented for the deterministic finite automaton (DFA) algorithm in re2 to find the shortest possible match for a given regex using a breadth-first search of states, and/or only searching with specified character sequences (start, end). The ruleset compiler 501a makes call to the above interface to pre-process the regex and saves the minimum match lengths or other skip tests with the regex object such that it only needs to be computed once per regex. The association of regex to skip test(s) is preferred because the computation can potentially be costly in terms of time (in the worst case, the common case is fast).

Returning to FIG. 5, the symbolic execution engine of the ruleset compiler 501a exports the results of the symbolic execution passes to the WAF Ruleset tree 502a. More specifically, for each regex a set of symbolic execution metadata is produced. This metadata preferably defines the skip tests that apply for the associated regex, and may contain other information such as whether the skip test can be applied pre-transformations or post transformations. The latter may be expressed as a set of restrictions, e.g., the skip test cannot be applied before transformations that grow input, etc.

Each of the regexes is analyzed in turn and the corresponding metadata produced.

The resulting WAF ruleset tree 502a is a set of regexes suitable for execution by the WAF in the HTTP server, each with one or more associated skip tests. In an optional optimizing step, the skip tests for the regexes may be scanned for redundancies. For example, if two regexes were each subject to a skip test of minimum length <3, then a single execution of that skip test can lead to skipping both associated regexes.

When executing a regex for a given firewall rule, preferably the system skips processing based on the skip tests. If any skip test is met, the regex can be skipped. For anything but an re2 regex, the skip tests do not necessarily apply (e.g., the minimum length is treated as 0, etc.), so no inputs can be skipped. Preferably the system ignores cases for firewall rule's match tags with result="false". The result="false" case could be optimized for the case where there is a match using this approach, which is not as interesting for a WAF engine.

The functionality illustrated in 500a-b and 501a-b of FIG. 5 can be deployed in a variety of ways. One way is to execute the pre-processing on a centralized infrastructure for each WAF rule, and then export the results (502a-b) to an appropriate WAF execution environment running in each server in a distributed network of client-facing servers.

Another way is to provide 500*a-b* and 501*a-b* in each server. Then, the WAF rulesets simply can be deployed to each server. Upon receipt of a new ruleset or new version of a ruleset, each server runs its pre-processing and creates the WAF ruleset tree 502*a-b* shown in FIG. 5.

Embodiment with Control Metadata in Distributed Firewall/Content Delivery Network (CDN)

Preferably, the teachings hereof can be implemented in a firewall such as the one described in U.S. Pat. No. 8,458,769, the teachings of which are hereby incorporated by reference in their entirety. That patent describes, among other things, a distributed web application firewall. The firewall has rules that can be converted into a metadata functional solution, with control metadata being delivered to and applied at servers in the manner described in U.S. Pat. No. 7,240,100, the disclosure of which is incorporated herein by reference, in order to run the firewall against incoming traffic. In short, each tenant of the platform can have a particular metadata configuration file with directives and parameters for how the server should handle that tenant's traffic, and that can include applying a given set of firewall rules against the traffic. The symbolic execution metadata produced in FIG. 5 can be nicely incorporated into this control metadata, when using this implementation approach.

The '769 patent mentions the use of a match tag in the metadata <match:regex> to implement firewall rules, providing an example in that patent's FIG. 8 of certain rules, and it is reproduced here for convenience as FIG. 9. According to the teachings hereof, when a server using a metadata solution for configuration and control encounters a match tag (i.e., as part of processing a given HTTP request), it can execute the skip test that is associated the firewall rule that the match tag expresses. Preferably, when processing of the match tag can be skipped, the selector values never created, input never copied, transformations are never performed, and regex execution never happens.

In an embodiment using control metadata to implement firewall rules, additional metadata tags can be used to support the functionality described herein. These metadata tags, shown in Table B below, can be included in a separator <edgeservices:waf-regex-symbolic-optimizer>.

TABLE B

| Metadata Tag | Scope | Type | Default | Description |
| --- | --- | --- | --- | --- |
| rollback-allow-skip-early | baseline | flag | Off | Turn early skip feature on and off. |
| rollback-allow-skip-early-with-constraints | baseline | flag | Off | Turn early skip with only alphanumerics feature and early skip feature with alphanumerics and -_. on and off (note, this tag has no effect if both rollback-allow-skip-early and rollback-allow-skip-late are on). |
| rollback-allow-skip-late | baseline | flag | Off | Turn late skip feature on and off. |
| status | request | tri-state: on/warn/off | Off | Request scoped control to enable or disable use of any of the above optimizations. Warn mode for testing accuracy. |

Preferably, the metadata configuration can also include support for a parameter <match:regex allow-symbolic-optimization="off"> which is on by default only for match:regex tags that use selectors. It can be turned off for these tags selectively, preventing minimum match length or other threshold properties from being calculated at metadata compile-time.

For reporting purposes, a server configured with the teachings hereof can produce a table with the parameters shown below in Table C. Table C contains statistics on the number of early skips and late skips due to minimum match length or other optimizations. Its entries are preferably updated periodically, e.g., every minute, two minutes, five minutes, or the like.

TABLE C

| Name | Type | Description |
| --- | --- | --- |
| server IP | ip | Server machine IP address |
| min_size_early_skips | integer | Number of values that could be skipped early due to minimum match length. |
| min_size_early_skips_alphanum | integer | Number of values that could be skipped early due to minimum match length with only alphanumerics. |
| min_size_early_skips_extra | integer | Number of values that could be skipped early due to minimum match length with alphanumerics and "-_.". (alphanumeric-pdu character set). |
| min_size_late_skips | integer | Number of values that could be skipped late due to minimum match length. |
| min_size_no_skips | integer | Number of values that actually run regexes, after skipping. |

Feature Testing

To support testing, preferably there is a reporting mode titled server_waf_regex_warn_mode to report if a selector value was skipped but then matched a rule, in which case the following debug information is provided (Table D).

TABLE D

| Name | Type | Description |
| --- | --- | --- |
| server IP | ip | Server machine IP address |
| feature | string | "min-size" |
| customer code | integer | Customer code for the mismatching rule (for multi-tenant environments |

TABLE D-continued

| Name | Type | Description |
|---|---|---|
| context | string | Name of the file/context for the mismatching rule |
| lineno | integer | Line number of the mismatching rule |
| input size | integer | Length of the selector value input which resulted in mismatching rule |

During test, baseline tags should be enabled by default; match:regex tags with selectors use allow-symbolic-execution-optimization="on" by default. Rollouts for test should begin with request scoped status tag set to "warn" in WAF with server_waf_regex_warn_mode also enabled and reporting active. Any entries in Table D would indicate a bug, which could affect the accuracy of the firewall engine. If no entries in table, request scoped status tag can be moved to "on" (which applies the performance improvement).

Other Embodiments

Preferably, the result of a given skip test is cached so that it does not need to be re-executed for a later-encountered firewall rule in the configuration. For example, if a skip test for a given rule involves scanning each value to see whether it contains only alphanumerics, the answer can be cached, and then easily referenced for each firewall rule whose applicability depends thereon.

Also, if caching is implemented as just described, it would be worth doing a scan as part of the "late skip" pass—to see if after decoding the input has simplified sufficiently to be skipped. In other words, early in this disclosure it was explained that in some embodiments, the system can perform only a subset the skip tests during a late skip, in particular skipping tests that were ineligible for early skip on the premise that after transformation the input is not likely to have changed in a significant way (i.e., it's unlikely that an input that was not alphanumeric before transformations becomes alphanumeric). In such cases the cost of checking for the condition may be more than the benefit obtained. However, if the result of the check is cached, then the cost of checking is lower, and thus may be worthwhile doing.

In another variation, WAF rules can be analyzed as a set. In other words, in the foregoing embodiments, each WAF rule was pre-processed to produce an associated skip test. It is also possible to compile a plurality of rules together to create one state machine. This can be then be analyzed using the same techniques already described. The resulting skip test applies to the entire set of rules that were compiled together. If an input meets the conditions of the skip test, then the entire set of rules can be skipped. This approach has a downside that if the skip test is not met, then none of the rules can be skipped. If the rules had been analyzed independently, it might have been possible to skip some of them.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 10:
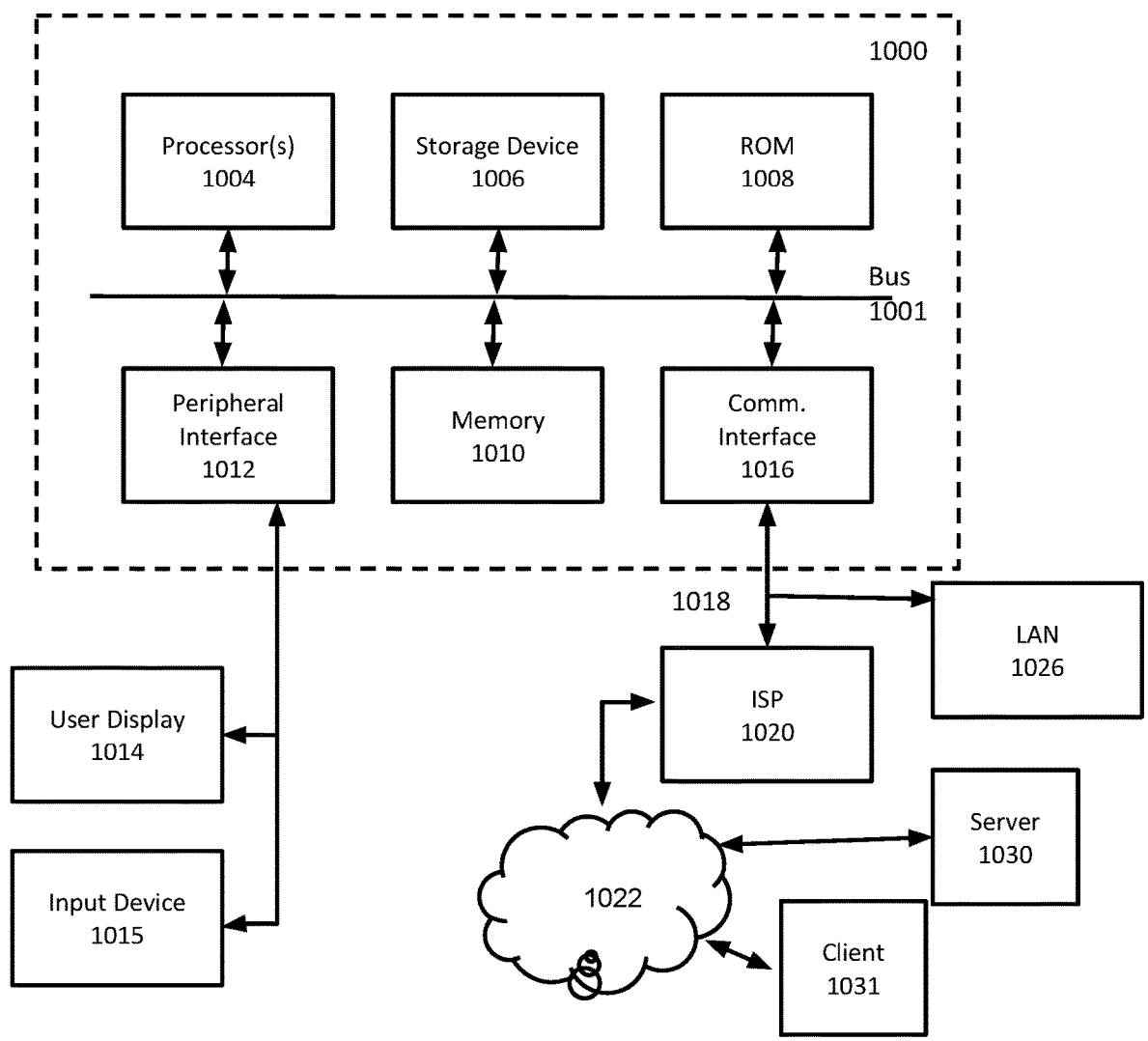

FIG. 10 is a block diagram that illustrates hardware in a computer system 1000 upon which such software may run in order to implement embodiments of the invention. The computer system 1000 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 1000 includes a microprocessor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1016 that provides a link (e.g., at a physical layer, data link layer,) between the system bus 1001 and an external communication link. The communication interface 1016 provides a network link 1018. The communication interface 1016 may represent a Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code may be read from or stored on a non-transitory computer-readable medium, such as memory 1010, ROM 1008, or storage device 1006. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1018 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for improving the performance of a web application firewall, the method performed by one or more servers, each of which comprises circuitry forming one or more processors and memory storing instructions for execution on the one or more processors, the method comprising:
    A. pre-processing a firewall rule, comprising:
        receiving the firewall rule for pre-processing prior to installation in a web application firewall, the firewall rule to be applied to inputs to find a signature therein, the firewall rule further comprising one or more actions for the web application firewall to take upon finding the signature;
        wherein the inputs comprise any of HTTP messages and portions of HTTP messages;
        analyzing the firewall rule to create therefrom a skip test, the skip test being distinct from the firewall rule and specifying one or more conditions for skipping the firewall rule because triggering the firewall rule is not possible under the one or more conditions;
        wherein one or more conditions of the skip test comprise at least one of: (i) a given input lacks a minimum length and (ii) a given input consists only of characters from a predefined set of characters;
    B. subsequent to said pre-processing of the firewall rule, sending the firewall rule and the skip test for installation in the web application firewall;
    C. operating the web application firewall, said operation comprising:
        receiving at least a portion of an HTTP message from a network interface of the server;
        applying the skip test to the at least a portion of an HTTP message;
        upon a determination that the skip test is met, causing the web application firewall to skip execution of the firewall rule on the at least a portion of an HTTP message; and,
        upon a determination that the skip test is not met, causing the web application firewall to execute the firewall rule on the at least a portion of an HTTP message.

2. The method of claim 1, wherein the skip test is applied before transforming the at least a portion of an HTTP message.

3. The method of claim 2, wherein the transformation comprises any of:
    compression, decompression, encoding, decoding, normalization, whitespace removal, hashing, serialization, deserialization.

4. The method of claim 1, wherein the skip test is applied after transforming the at least a portion of an HTTP message.

5. The method of claim 4, wherein the transformation comprises any of:
    compression, decompression, encoding, decoding, normalization, whitespace removal, hashing, serialization, deserialization.

6. The method of claim 1, wherein the analyzing of the firewall rule to create the skip test therefrom comprises: representing a regular expression as a tree of one or more operations and applying symbolic execution analysis to the tree.

7. The method of claim 6, further comprising, saving the result of the symbolic execution analysis with the tree for subsequent runtime execution of the firewall rule by the web application firewall.

8. The method of claim 6, wherein the tree represents a subtree of a larger tree that corresponds to a plurality of rules in a ruleset for the web application firewall.

9. The method of claim 1, comprising skipping execution of the firewall rule and sending the at least a portion of an HTTP message to a request processing function in a web server.

10. The method of claim 1, wherein the one or more conditions comprises (ii) a given input consists only of characters from a predefined set of characters, and the predefined set of characters consists only of alphanumeric characters.

11. The method of claim 1, wherein the one or more conditions comprises (ii) a given input consists only of characters from a predefined set of characters, and the predefined set of characters consists only of alphanumeric characters and a period, a dash, and an underscore.

12. A system, comprising:
    A. a first computer comprising circuitry forming one or more processors and memory storing instructions for execution on the one or more processors, the instructions instructing the first computer to, upon execution of the instructions:
    pre-process a firewall rule, at least by:
        receiving the firewall rule for pre-processing prior to installation in a web application firewall, the firewall rule to be applied to inputs to find a signature therein, the firewall rule further comprising one or more actions for the web application firewall to take upon finding the signature;
        wherein the inputs comprise any of HTTP messages and portions of HTTP messages;

analyzing the firewall rule to create therefrom a skip test, the skip test being distinct from the firewall rule and specifying one or more conditions for skipping the firewall rule because triggering the firewall rule is not possible under the one or more conditions;

wherein the one or more conditions of the skip test comprises at least one of: (i) a given input lacks a minimum length and (ii) a given input consists only of characters from a predefined set of one or more characters;

sending the firewall rule and the skip test for installation in the web application firewall at a second computer;

B. the second computer comprising circuitry forming one or more processors and memory storing instructions for execution on the one or more processors, the instructions instructing the second computer to, upon execution of the instructions and subsequent to said pre-processing of the firewall rule by the first computer:

operate the web application firewall, said operation comprising:

receiving at least a portion of an HTTP message from a network interface of the second computer;

applying the skip test to the at least a portion of an HTTP message;

upon a determination that the skip test is met, causing the web application firewall to skip execution of the firewall rule on the at least a portion of an HTTP message; and upon a determination that the skip test is not met, causing the web application firewall to execute the firewall rule on the at least a portion of an HTTP message.

13. The system of claim 12, wherein the skip test is applied before transforming the at least a portion of an HTTP message.

14. The system of claim 13, wherein the transformation comprises any of:
compression, decompression, encoding, decoding, normalization, whitespace removal, hashing, serialization, deserialization.

15. The system of claim 12, wherein the skip test is applied after transforming the at least a portion of an HTTP message.

16. The system of claim 15, wherein the transformation comprises any of:
compression, decompression, encoding, decoding, normalization, whitespace removal, hashing, serialization, deserialization.

17. The system of claim 12, wherein the analyzing of the firewall rule to create the skip test therefrom comprises: representing a regular expression as a tree of one or more operations and applying symbolic execution analysis to the tree.

18. The system of claim 17, further comprising, saving the result of the symbolic execution analysis with the tree for subsequent runtime execution of the firewall rule by the web application firewall.

19. The system of claim 17, wherein the tree represents a subtree of a larger tree that corresponds to a plurality of rules in a ruleset for the web application firewall.

20. The system of claim 12, comprising skipping execution of the firewall rule and sending the at least a portion of an HTTP message to a request processing function in a web server.

21. The system of claim 12, wherein the one or more conditions comprises (ii) a given input consists only of characters from a predefined set of characters, and the predefined set of characters consists only of alphanumeric characters.

22. The system of claim 12, wherein the one or more conditions comprises (ii) a given input consists only of characters from a predefined set of characters, and the predefined set of characters consists only of alphanumeric characters and a period, a dash, and an underscore.

* * * * *